United States Patent [19]

Schillaci et al.

[11] Patent Number: 5,440,610
[45] Date of Patent: Aug. 8, 1995

[54] MECHANISM FOR CONTROLLING OPERATION OF TELEPHONE METALLIC LOOP MEASUREMENT DEVICE IN DEPENDENCE UPON RATE OF SETTLING OF TELEPHONE LINE VOLTAGE

[75] Inventors: Onofrio Schillaci, Camarillo; Ben Pierce, Oja; Steve R. Coffelt; Edward K. W. Siu, both of Simi Valley, all of Calif.

[73] Assignee: Harris Corporation, Melbourne, Fla.

[21] Appl. No.: 48,348

[22] Filed: Apr. 14, 1993

[51] Int. Cl.⁶ .................. H04M 1/24; H04M 3/08; H04M 3/22
[52] U.S. Cl. .................. 379/24; 379/27; 379/29; 379/34
[58] Field of Search .............. 379/1, 6, 22, 24, 26, 379/27, 29, 30, 34

[56] References Cited

U.S. PATENT DOCUMENTS 4,641,299 3/1987 Kemper et al. .................. 379/27 X
4,709,386 11/1987 Shimizu ............................ 379/24
5,054,050 10/1991 Burke et al. ................... 375/29 X
5,073,919 12/1991 Hagensick ..................... 379/30 X
5,222,119 6/1993 Asano .......................... 375/29 X

*Primary Examiner*—Stephen Chin
*Assistant Examiner*—Paul Loomis
*Attorney, Agent, or Firm*—Charles Wands

[57] ABSTRACT

The rate of change of a metallic subscriber loop charging characteristic and the period of time elapsed subsequent to the coupling of testing circuitry of a remote test unit coupled to the line are measured. The operation of the testing circuitry within the remote test unit is initiated in response to the rate of change of line voltage reaching a preselected rate of change, prior to the elapsed period of time reaching a prescribed time value. If the measured period of time reaches a prescribed value prior to the monitored rate of change of line voltage reaching the preselected rate of change, the last sampled value of the line voltage is stored and reported to a mechanized loop test system supervisory site.

16 Claims, 2 Drawing Sheets

MECHANISM FOR CONTROLLING OPERATION OF TELEPHONE METALLIC LOOP MEASUREMENT DEVICE IN DEPENDENCE UPON RATE OF SETTLING OF TELEPHONE LINE VOLTAGE

FIELD OF THE INVENTION

The present invention relates in general to telephone network loop test systems, and is particularly directed to a mechanism for controllably initiating the operation of a mechanized loop test device in dependence upon the rate of change of monitored telephone line voltage reaching a prescribed rate of change, associated with a settling of the line voltage to a level acceptable for conducting loop test measurements.

BACKGROUND OF THE INVENTION

Regional Bell operating companies (RBOCs), and telephone companies (TELCOs) in general, employ metallic loop test (MLT) systems for testing metallic wire links of telephone communication systems, e.g. plain old telephone services (POTS). Such metallic loop test systems, standards for which were originally specified by AT&T Technologies, comprise a software-controlled supervisory mechanism, including user interface, line record database, test coordination and interpretation, a central office (CO)-based subscriber loop test system, and a remote measurement unit (RMU).

As diagrammatically illustrated in FIG. 1, the remote measurement unit, shown at 11, is customarily located at a digital loop carrier site 13, where there is access to a metallic link (tip/ring) pair 15, which provides a direct loop connection to a subscriber equipment termination site 17.

Testing of the metallic subscriber loop 15, which typically involves line measurements of DC/AC voltage, DC/AC resistance, line capacitance, etc., is conducted by the remote measurement unit 11 in response to remotely initiated test commands, supplied to the digital loop carrier site via the central office, shown at 10. The MLT-prescribed protocol of a loop test request from the central office 10 includes specifying the test to be conducted, the time required for the line voltage (of loop 15) to settle after connecting the loop to the measurement circuitry of the remote test unit 11, and what loop electrical parameter is to be tested.

When the remote test unit 11 initiates a test of the subscriber loop 15, it connects (via a controlled set of relay contacts, not shown) the metallic link pair 15 to test measurement circuitry 12 within the RMU and waits for a prescribed period of time, that is of sufficient duration for the electrical charges on line 15 to settle. Once the line has settled, testing of the line by loop-connected test measurement circuitry 12 of the RMU is conducted, with monitored line electrical parameters being digitized by an analog-digital converter 23 and stored in attendant RAM of the test unit's microcontroller 25, so that the test results may be reported to the remote MLT-supervisory site. The metallic line is coupled to the input of analog-digital converter 23 through a resistor ladder network 24, respective sections of which are controllably switched into the input path of analog-digital converter 23, in order that its digitized output will appropriately reflect a prescribed range of voltage to be monitored.

The settling time is customarily specified at a fixed interval of sufficient duration to accommodate a worst case condition associated with the longest subscriber loop in the network. Because this worst case condition can be expected to be considerably longer than the settling time of the majority of the subscriber loops, the efficiency of the testing mechanism suffers, as it is necessary to delay testing of a 'typical' loop until the fixed, worst case settling time has expired.

SUMMARY OF THE INVENTION

In accordance with the present invention, rather than wait for the expiration of a worst case settling time before beginning loop testing, the line is monitored to determine when its voltage is within acceptable limits, so as to permit testing of the line. In particular, both the rate of change of line voltage of the metallic telephone line and the period of time elapsed subsequent to the coupling of the testing circuitry to the line are measured. The operation of the test circuitry within the RMU is initiated in response to the rate of change of line voltage reaching a preselected rate of change, prior to the elapsed period of time reaching a prescribed time value, indicating that the voltage on the line has settled to an acceptable level. If the measured period of time reaches a prescribed value prior to the monitored rate of change of line voltage reaching the preselected rate of change, the last sampled value of the line voltage is stored and reported to the MLT supervisory site.

Measuring the lapse of time subsequent to connecting the loop test circuitry to the line is initiated by starting a timer when the loop is connected to the test circuit. To measure the rate of change of voltage on the line, successive samples of the output of the analog-digital converter, which digitizes the monitored line voltage, are compared with one another. If the difference between successive samples falls within a prescribed range of values, associated with an acceptable settling voltage, prior to the time monitored by the timer reaching the prescribed time value, the timer is reset and the testing circuitry is enabled, so that it may proceed with testing of the subscriber loop. On the other hand, if the time monitored by the timer reaches the prescribed time value, prior to the sample difference reaching the prescribed range of values, the microcontroller stores the most recent line voltage sample value digitized by the analog-digital converter, for transmission to the MLT supervisory site.

DETAILED DESCRIPTION

Figure 1:
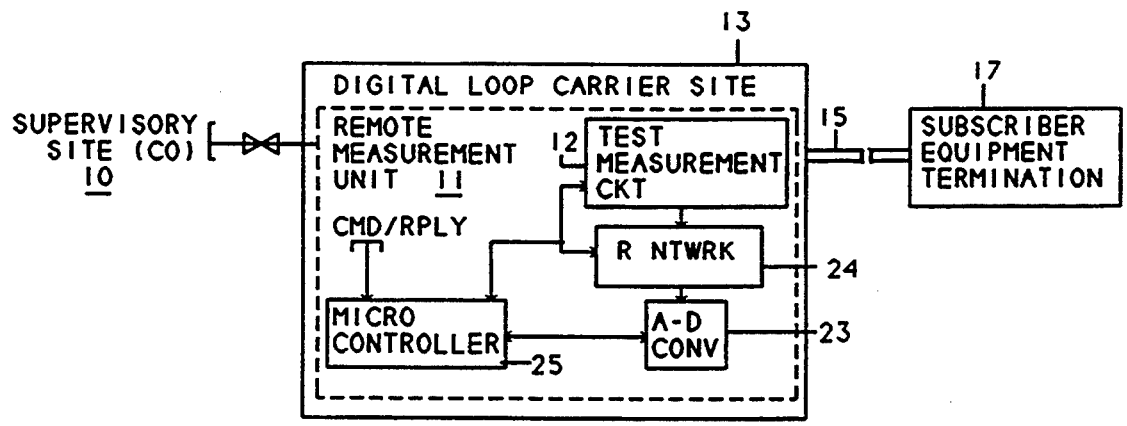
FIG. 1 diagrammatically illustrates a test interface for a telephone subscriber loop, including a remote measurement unit, located at a digital loop carrier site, which provides access to the metallic link of the subscriber loop to a subscriber equipment termination site.

Before describing in detail the improved subscriber loop test control mechanism in accordance with the present invention, it should be observed that the present invention resides primarily in what is effectively a prescribed augmentation of the control software employed by the microcontroller within the remote test unit installed at the digital loop carrier site, so as to permit the test unit to rapidly respond to a test command sourced from a remote test system controller. The details of the circuitry of the units of the telephone network are otherwise essentially unaffected. Consequently, the configuration of such units and the manner in which they are interfaced with other communication equipment of the telephone network have been illustrated in the drawings by readily understandable block diagrams, which show only those specific details that are pertinent to the present invention, so as not to obscure the disclosure with details which will be readily apparent to those skilled in the art having the benefit of the description herein. Thus, the block diagram illustrations of the Figures are primarily intended to illustrate the major components of the system in a convenient functional grouping, whereby the present invention may be more readily understood.

As pointed out above, the present invention effectively obviates the need for the remote test unit to wait for the expiration of a worst case settling time before beginning loop testing, by monitoring line to determine when its voltage is within acceptable limits. For this purpose, the remote measurement unit's microcontroller test software is enhanced in accordance with the test control mechanism (a flow chart for which is shown in FIG. 2, to be described) through which both the rate of change of line voltage of the subscriber (metallic) loop and the period of time elapsed subsequent to the coupling of the testing circuitry to the line are measured.

Figure 2:
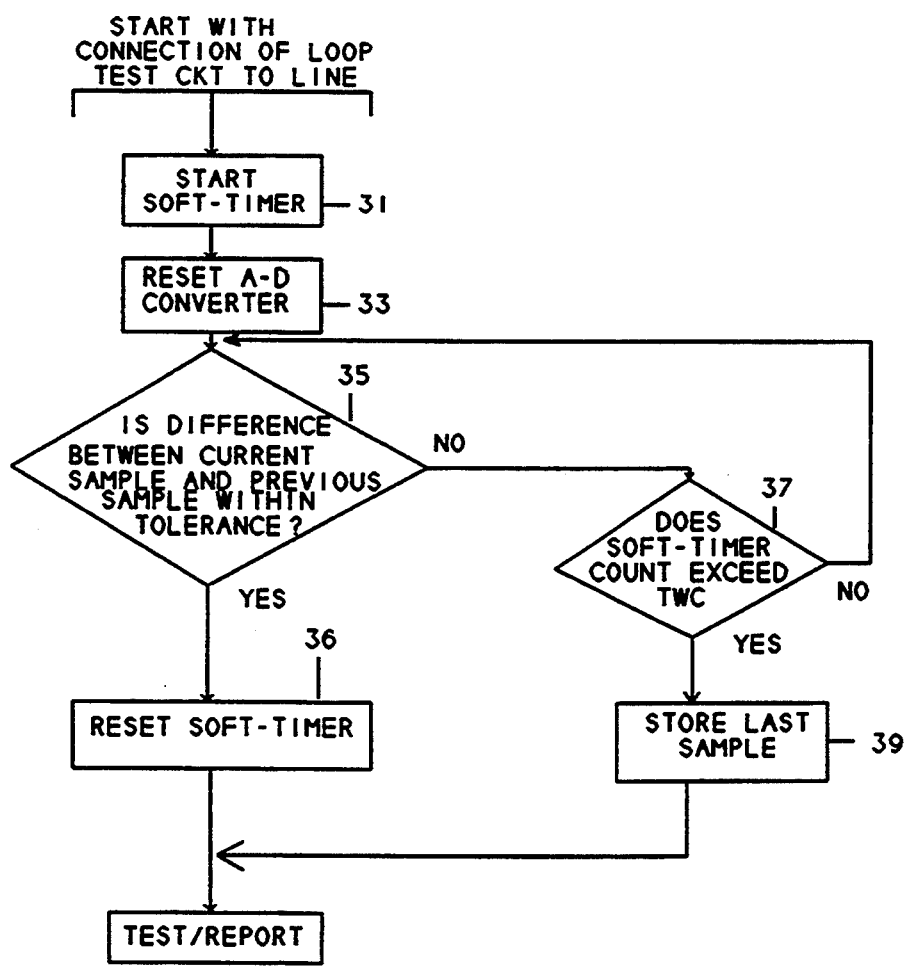
FIG. 2 is a flow chart of the enhancement of the remote measurement unit's microcontroller test software in accordance with the test control mechanism of the present invention.

More particularly, with reference to FIGS. 1 and 2, in response to a loop test command message from the supervisory unit, the micro-controller 25, within digital loop carrier site 13, causes the loop test circuitry within the remote test unit 11 to be connected to a selected metallic link of the subscribed loop for testing. Upon making this connection a soft-timer within the microcontroller is enabled, as shown at STEP 31. In addition, as shown at STEP 33, analog-digital converter 23 is reset. Once the analog-digital converter has been reset, successive samples of the line voltage are digitized and read by microcontroller 25. (As successive samples are read in, the effective resistance of resistor ladder network 24 is controlled by microcontroller 25 in accordance with the range of voltage values into which the digitized line sample falls. For purposes of a non-limitative example, for an analog-digital converter with a twelve bit encoding resolution (having a range of output values of 0–4095), the range adjusting resistors of network 24 may provide coverage over four respective line voltage measurement ranges: 40 mv–400 mv, 400 mv–4 v, 4 v–40 v, and 40 v–400 v.)

As the line voltage is sampled and digitally encoded, the value of the most recent sample is compared in STEP 35 with the value of the previous sample. If the difference between successive samples falls within a prescribed range of values representative of the effective settling of the line voltage to within acceptable limits, the output of STEP 35 is YES. If the difference between successive samples does not fall within this prescribed range of values, the output of STEP 35 is NO.

Figure 3:
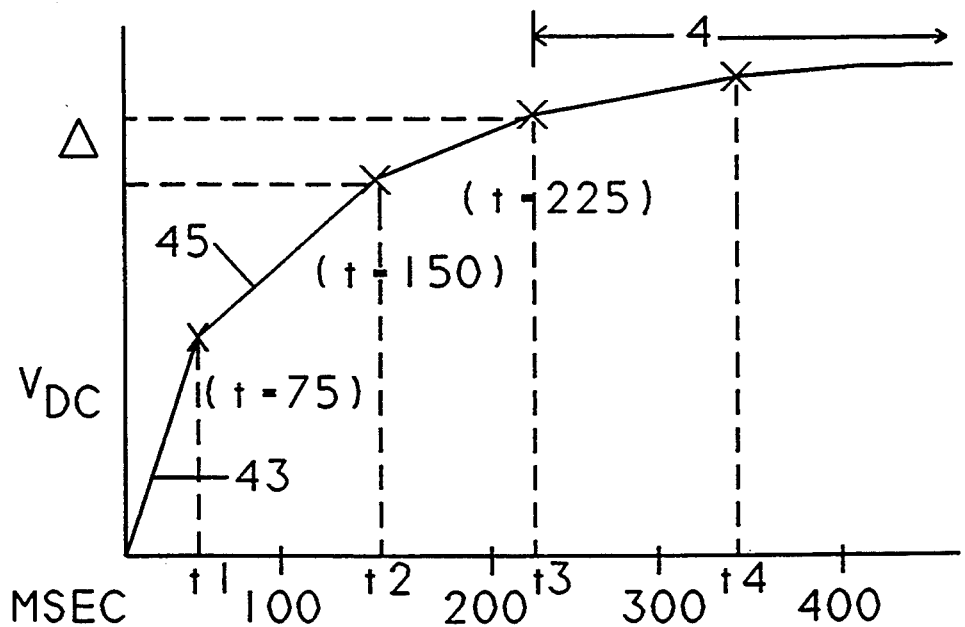
FIG. 3 diagrammatically illustrates a typical nonlinear line charging voltage vs. time characteristic.

The range of values associated with the effective settling of the line is diagrammatically illustrated in FIG. 3 as occupying a portion 41 of a typical non-linear line voltage vs. time characteristic 43, where the rate of change of line voltage with time is relatively small, e.g. has a settling error within prescribed limits. The line voltage characteristic of FIG. 3 effectively represents the charging of the line capacitance through a resistive path from the test circuitry of the remote test unit 11. In the characteristic of FIG. 3, the line voltage is illustrated as being sampled at successive, equally spaced instants in time t1, t2, t3, t4, etc. (For the scale shown, the line voltage is sampled every 75 ms.)

Once the line begins to approach its fully charged condition, and begins to level off or stabilize beyond the knee 45 of its charging voltage characteristic, the line voltage change with time becomes substantially insignificant and has an acceptable settling error. In accordance with a preferred embodiment of the present invention, when the value of the sampled line voltage falls within a prescribed tolerance, the line is considered to have settled. For an upper portion of the characteristic (well beyond the knee 45), the magnitude of the prescribed difference in successive sample values associated with an acceptable settling of the line voltage may be larger than for the case where the value of the sampled line voltage falls has not yet reached this upper portion of the characteristic well beyond the knee. For the present example of a twelve bit analog-digital converter, as long as the value of each of the two most recent digitally encoded sample values is below 1000, the difference between two consecutive samples must fall in an acceptable tolerance range of ±3 for the output of STEP 35 to be YES. If each of the encoded sample values is 1000 or higher, then the difference between two consecutive samples may fall in a wider acceptable tolerance range of ±5 for the output of STEP 35 to be YES. If the output of STEP 35 is YES, the process proceeds to STEP 36. In STEP 36, the soft-timer that was enabled in STEP 31 is reset, thereby terminating the time-out, and the testing circuitry of the RMU is enabled, so that it may proceed with testing of the subscriber loop.

If the result of STEP 35 is NO, the process proceeds to STEP 37, which compares the current count of the soft-timer with a prescribed settling time Twc. Settling time Twc corresponds to the worst case value, described previously. If the result of STEP 37 is NO, the process returns to STEP 35. If the result of STEP 37 is YES, indicating that the prescribed worst case settling time has expired, the process proceeds to STEP 39. In STEP 39, the microcontroller stores the most recent line voltage sample value digitized by the analog-digital converter, for transmission to the MLT supervisory site.

As will be appreciated from the foregoing description, monitoring the line charging voltage to determine when it is within acceptable settling error limits expedites testing of the line, without having to wait for the expiration of a worst case settling time before beginning loop testing. By measuring both the rate of change of line voltage of the metallic telephone line and the period of time elapsed subsequent to the coupling of the testing circuitry to the line are measured, the present invention assures that the testing circuitry of the remote measurement unit will be enabled in the shortest possible time that it can be determined that the line has settled. On the basis of performance evaluation, it has been determined that with the present invention, on average, decreases the total RMU test time by thirty seconds, or sixty percent.

While I have shown and described an embodiment in accordance with the present invention, it is to be understood that the same is not limited thereto but is susceptible to numerous changes and modifications as known to a person skilled in the art, and I therefore do not wish to be limited to the details shown and described herein but intend to cover all such changes and modifications as are obvious to one of ordinary skill in the art.

What is claimed:

1. For use with a communication link testing device which is controllably operative to conduct one or more tests of said communication link, a method of controllably enabling said communication link testing device to proceed with testing of said communication link, comprising the steps of:
   (a) monitoring a prescribed characteristic of an electrical parameter of said communication link; and
   (b) in response to the prescribed characteristic of the electrical parameter of said communication link in step (a) being representative that said electrical parameter of said communication link has settled to within acceptable limits, enabling said communication link testing device to proceed with testing of said communication link.

2. A method according to claim 1, wherein said prescribed characteristic of an electrical parameter of said communication link corresponds to a rate of change of said electrical parameter.

3. A method according to claim 2, wherein step (b) comprises enabling said communication link testing device to proceed with testing of said communication link in response to the rate of change of said electrical parameter of said communication link monitored in step (a) being less than a preselected rate of change.

4. A method according to claim 1, wherein said communication link comprises a metallic telephone signal-conveying link, step (a) comprises monitoring the rate of change of voltage on said metallic telephone signal-conveying link, and wherein step (b) comprises enabling said communication link testing device to proceed with testing of said metallic telephone signal-conveying link in response to said rate of change of voltage being less than a preselected rate of change.

5. For use with a metallic telephone line testing device which is controllably connectable to a metallic telephone line, so that said testing device may conduct one or more electrical parameter tests of said metallic telephone line, a method of controllably preventing said testing device from testing said metallic telephone line until the voltage on said metallic telephone line has settled to an acceptable level after connecting said testing device to said metallic telephone line, comprising the steps of:
   (a) monitoring the rate of change of voltage on said metallic telephone line and the period of time elapsed subsequent to the coupling of said testing device to said metallic telephone line; and
   (b) enabling said testing device to proceed with testing of said metallic telephone line in response to either the lapse of a prescribed period of time subsequent to the coupling of said testing device to said metallic telephone line, or in response to said rate of change of voltage reaching a preselected rate of change, indicative of the settling of the voltage on said metallic telephone line to said acceptable level.

6. A method according to claim 5, wherein step (a) comprises initiating the operation of a timer which monitors time elapsed subsequent to the connecting of said testing device to said metallic telephone line, and measuring the rate of change of voltage on said metallic telephone line, and wherein step (b) comprises, in response to said rate of change of voltage reaching said preselected rate of change prior to the time monitored by said timer reaching said prescribed period of time, enabling said testing device to proceed with testing of said metallic telephone line.

7. A method according to claim 5, wherein step (a) comprises initiating the operation of a timer which monitors time elapsed subsequent to the connecting of said testing device to said metallic telephone line, and measuring the rate of change of voltage on said metallic telephone line, and wherein step (b) comprises, in response to the time monitored by said timer reaching said prescribed period of time prior to said rate of change of voltage reaching said preselected rate of change, enabling said testing device to proceed with testing of said metallic telephone line.

8. A communication link testing device which is controllably operative to conduct one or more tests of a communication link, comprising:
   a controllable electrical parameter measurement circuit connectable to said communication link and being operative to generate an output signal representative of a measurable electrical parameter of said communication link; and
   a control unit, coupled to said controllable electrical parameter measurement circuit, and being operative to controllably connect said controllable electrical parameter measurement circuit to said communication link and monitor said output signal representative of said measurable electrical parameter of said communication link, and wherein said control unit is further operative to monitor a prescribed characteristic of an electrical parameter of said communication link and, in response to said prescribed characteristic of said monitored electrical parameter of said communication link being representative that said electrical parameter of said communication link has settled to within acceptable limits, enabling said electrical parameter measurement circuit to generate an output signal representative of a measurable electrical parameter of said communication link.

9. A communication link testing device according to claim 8, wherein said prescribed characteristic of an electrical parameter of said communication link corresponds to a rate of change of said electrical parameter.

10. A communication link testing device according to claim 9, wherein said control unit is operative to enable said controllable electrical parameter measurement circuit to proceed to generate an output signal representative of a measurable electrical parameter of said communication link in response to the rate of change of said electrical parameter of said communication link being less than a preselected rate of change.

11. A communication link testing device according to claim 8, wherein said communication link comprises a metallic telephone line, and wherein said control unit is operative to monitor the rate of change of voltage on said metallic telephone line, and enable said controllable electrical parameter measurement circuit to proceed to generate an output signal representative of a measurable electrical parameter of said metallic telephone line, in response to said rate of change of voltage being less than a preselected rate of change.

12. A communication link testing device according to claim 11, wherein said control unit is operative to monitor the period of time elapsed subsequent to the coupling of said controllable electrical parameter measurement circuit to said metallic telephone line, and enabling said testing device to proceed to generate an output signal representative of a measurable electrical parameter of said metallic telephone line in response to either the lapse of a prescribed period of time subsequent to the coupling of said controllable electrical parameter measurement circuit to said metallic telephone line, or in response to said rate of change of voltage reaching a preselected rate of change, indicative of the settling of the voltage on said metallic telephone line to an acceptable level.

13. A communication link testing device according to claim 12, wherein said control unit is operative to monitor time elapsed subsequent to the connecting of said controllable electrical parameter measurement circuit to said metallic telephone line, and measuring the rate of change of voltage on said metallic telephone line, and in response to said rate of change of voltage reaching said preselected rate of change prior to the monitored time reaching said prescribed period of time, enabling said controllable electrical parameter measurement circuit to proceed to generate an output signal representative of a measurable electrical parameter of said metallic telephone line.

14. A communication link testing device according to claim 12, wherein said control unit is operative to monitor time elapsed subsequent to the connecting of said controllable electrical parameter measurement circuit to said metallic telephone line, and measuring the rate of change of voltage on said metallic telephone line and, in response to the monitored time reaching said prescribed period of time prior to said rate of change of voltage reaching said preselected rate of change, enabling said controllable electrical parameter measurement circuit to proceed to generate an output signal representative of a measurable electrical parameter of said metallic telephone line.

15. A method according to claim 1, wherein step (a) comprises monitoring the rate of change of DC voltage of said communication link, and wherein step (b) comprises, in response to the rate of change of DC voltage reaching a rate of change associated with a settling of said DC voltage on said communication link, enabling said communication link testing device to proceed with testing of said communication link.

16. A communication link testing device according to claim 8, wherein said control unit is operative to monitor the rate of change of DC voltage of said communication link and, in response to the rate of change of said DC voltage reaching a rate of change associated with a settling of said DC voltage on said communication link, enabling said controllable electrical parameter measuring circuit to generate an output signal representative of a measurable electrical parameter of said communication link.

* * * * *